Aug. 18, 1931.   J. KRAUT   1,819,780
TRESTLE OR SAW HORSE
Filed June 25, 1929
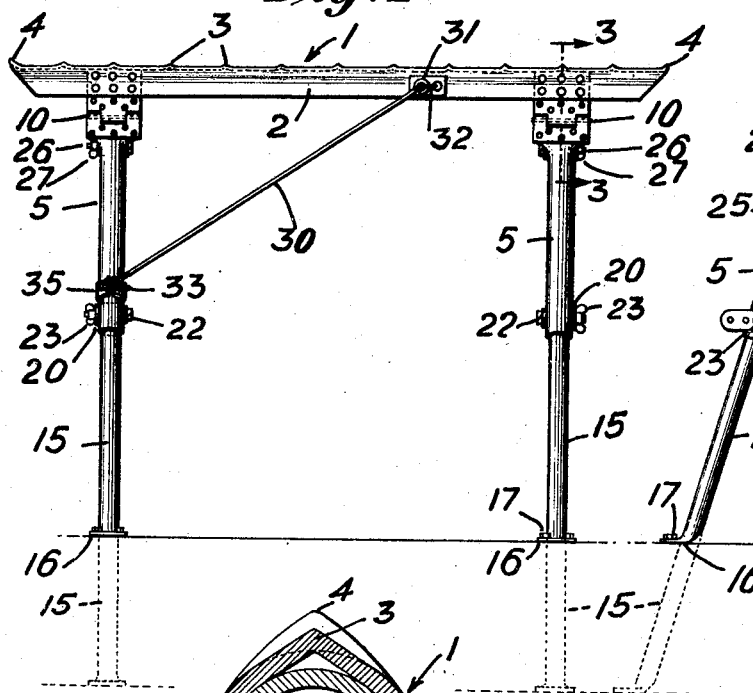
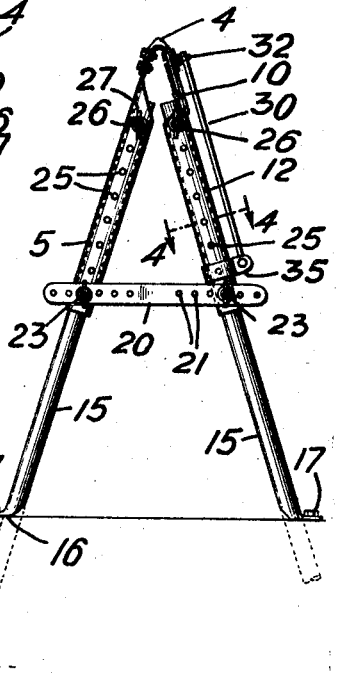
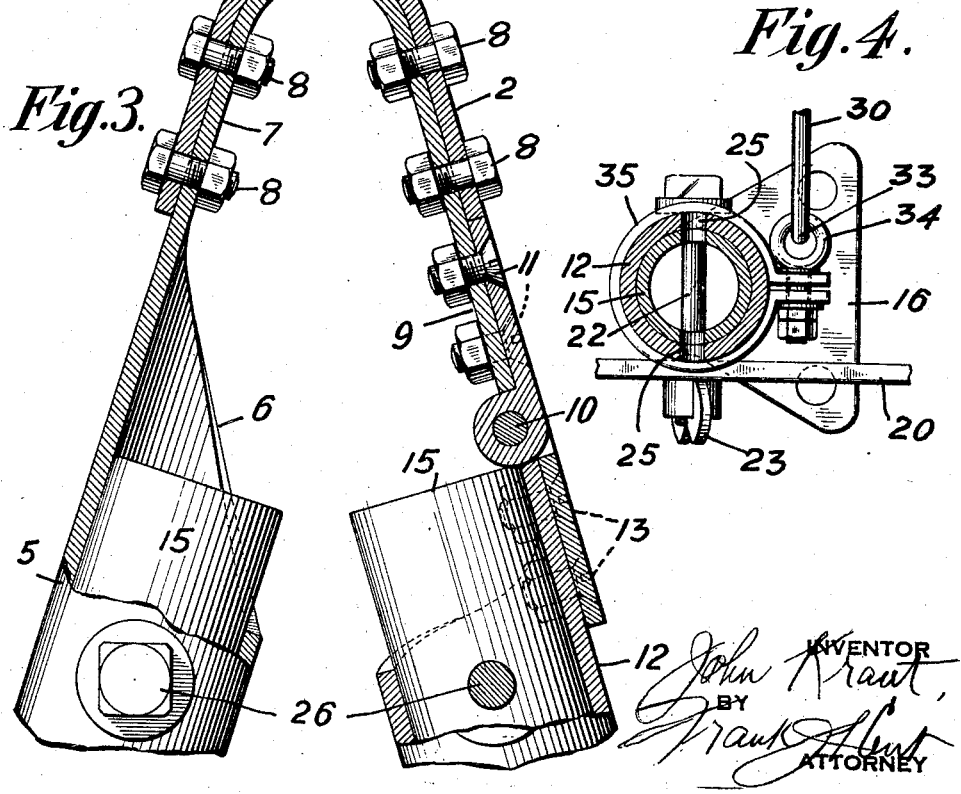

Patented Aug. 18, 1931

1,819,780

UNITED STATES PATENT OFFICE

JOHN KRAUT, OF BROOKLYN, NEW YORK

TRESTLE OR SAW HORSE

Application filed June 25, 1929. Serial No. 373,613.

My invention relates to trestles or work supports. In the present example the appliance is designed for use as a saw horse, although it is adapted or adaptable for other purposes.

The general object is to provide a strong and durable work support which may be made of relatively cheap material and which is adjustable in various ways and is also foldable or collapsible for compactness in shipment or storage.

The characteristics and advantages of the invention are further sufficiently explained in connection with the following detail description of the accompanying drawings, which shows one representative embodiment. After considering this example, skilled persons will understand that many variations may be made without departing from the principles disclosed, and I contemplate the employment of any structures that are properly within the scope of the appended claims.

In the drawings:

Fig. 1 is a side elevation of a support or saw horse embodying the invention in one form.

Fig. 2 is a left end elevation.

Fig. 3 is an enlarged sectional detail at 3—3, Fig. 1.

Fig. 4 is an enlarged section at 4—4, Fig. 2.

The entire appliance is desirably composed of metal, in simple forms or shapes, easily obtained and fabricated.

The principal parts are connected to a top piece or rail 1 of approximate V-section, having flaring sides 2, and a slightly rounded top provided at intervals with shallow spike or tooth formations 3, and also preferably having its ends upturned or arranged as horns 4, these prong and horn formations, when provided, aiding in retaining "work" upon the support. A pair of legs is secured near each end of the rail. The upper part of one leg of each pair desirably consists of a piece of metal pipe or tubing 5, the end of which is cut on a bevel as at 6, and formed into a flat strip 7, which is bent into V form to conform to the inner faces of the side members of the rail, and secured thereto as by bolts 8. One end 9 of this strip is extended to provide for the connection of one member of a hinge 10, the hinge member being secured to the strip portion by bolts 11. Where ready disassembly is not considered necessary, rivets may be substituted for the bolts 8 and 11. The upper portion of the other of each pair of legs consists of a piece of tubing 12, the upper end of which is connected as by bolts or rivets 13 to the other member of hinge 10. The hinges provide for the folding of the legs to parallel position, for shipment or storage. The lower portion of each leg consists of a tube 15 dimensioned to telescope in one of the upper leg tubes 5 and 12. The lower end of each lower tube or leg section is desirably arranged as a foot or base 16 and may be secured to the floor or other support, as by screws 17, if permanent installation is desired.

When not permanently set up and secured to a base the legs are preferably adjustable to different angles. For this purpose crossbraces 20 are provided, consisting of flat strips of metal provided with spaced bolt holes 21. One of these strips may be provided for each pair of legs and secured to the lower ends of the respective upper leg members 5 and 12 as by stud bolts 22 passing through the holes 21, and wing nuts 23 on the bolts.

Leg length adjustment is provided by a series of holes 25 in the upper leg members 5 and 12 and one or more holes in the lower leg members, and through bolts 26, which may be inserted through any of the holes, and secured by wing nuts 27 to regulate the lengthwise extension of the lower leg members in relation to the upper ones.

It is desirable in some cases to provide longitudinal bracing. Thus I provide a link or strut 30 consisting of a metal rod having at one end an eye 31 secured in an eye or hasp 32 which is inserted in or affixed to one of the side members of the rail. The other end of the strut has a hook 33 cooperating with an eye 34 secured to one of the upper leg members, as for example by a band clamp 35 and a bolt passing through the ends of the band and also carrying the eye 34. The hook may be detached and the strut folded alongside the rail when the appliance is not in use.

By the described structure or arrangement any necessary adjustment may be made for height, leg angle, etc.

I claim:

1. A metal work support of character described, comprising a top rail of substantially V section, tubular upper leg sections rigidly connected to one side member of the rail, other tubular upper leg sections hingedly connected to the other side member of the rail, to permit variation of the leg angle, and lower tubular sections telescoped in the upper sections.

2. A metal work support of character described, comprising a top rail of V section, and having upturned horns at its ends, tubular upper leg sections rigidly connected to one side member of the rail, other tubular upper legs sections hingedly connected to the other side member of the rail, to permit variation of the leg angle, and lower tubular sections telescoped in the upper sections.

3. A metal work support of character described, comprising a top rail of V section provided on its upper side with spike formations and having upturned horns at its ends, tubular upper leg sections rigidly connected to one side member of the rail, other tubular upper leg sections hingedly connected to the other side member of the rail, to permit variation of the leg angle, and lower tubular leg sections telescoped in the upper sections.

In testimony whereof I affix my signature.

JOHN KRAUT.